(12) United States Patent
Kashiki

(10) Patent No.: US 7,173,770 B2
(45) Date of Patent: Feb. 6, 2007

(54) ZOOM LENS AND IMAGING APPARATUS USING THE SAME

(75) Inventor: Yasutaka Kashiki, Hino (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/929,548

(22) Filed: Aug. 31, 2004

(65) Prior Publication Data
US 2005/0046964 A1 Mar. 3, 2005

(30) Foreign Application Priority Data
Sep. 2, 2003 (JP) ............................. 2003-310160

(51) Int. Cl.
*G02B 15/14* (2006.01)
(52) U.S. Cl. ..................... 359/689; 359/683
(58) Field of Classification Search ................ 359/689
See application file for complete search history.

(56) References Cited

U.S. PATENT DOCUMENTS

| | | | |
|---|---|---|---|
| 5,104,748 A | 4/1992 | Mori et al. ................ 428/674 |
| 6,185,049 B1 | 2/2001 | Terada et al. ............... 359/689 |
| 6,236,515 B1 | 5/2001 | Yamamoto et al. .......... 359/689 |
| 6,657,791 B2 * | 12/2003 | Nishimura .................. 359/686 |
| 6,710,935 B2 * | 3/2004 | Morooka .................... 359/689 |

FOREIGN PATENT DOCUMENTS

| | | |
|---|---|---|
| JP | 2002-098894 | 4/2002 |
| JP | 2002-258158 | 9/2002 |

* cited by examiner

*Primary Examiner*—Ricky Mack
*Assistant Examiner*—William Choi
(74) *Attorney, Agent, or Firm*—Kenyon & Kenyon LLP

(57) ABSTRACT

An imaging apparatus includes, a zoom lens and a field stop for determining the extent of an imaging field, arranged at an object side of the zoom lens. The zoom lens has in order from an object side, a first lens group having positive refracting power, a second lens group consisting of at least three lens elements and having positive refracting power, and the third lens group consisting of one single lens element and having negative refracting power. Zooming from a short focal length end to a long focal length end is performed by moving each of the lens groups to the object side, and the following conditions are satisfied:

$3.0 < ft/fw$ $0.7 < IH/fw < 0.9$ $1.75 < ft/fl\_G1 < 2.5$ $2.8 < fw/sk\_w < 4.1$ where ft is the focal length of the long focal length end, fw is the focal length of the short focal length end, IH is the maximum image height, fl_G1 is the composite focal length of the first lens group, and sk_w is the backfocus at the short focal length end.

45 Claims, 7 Drawing Sheets

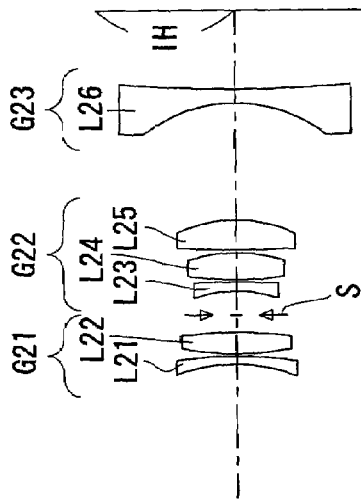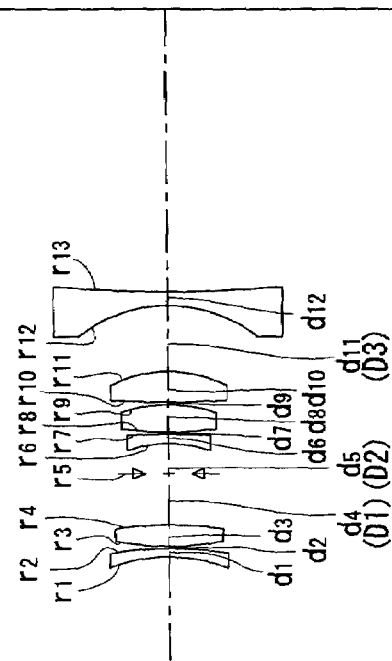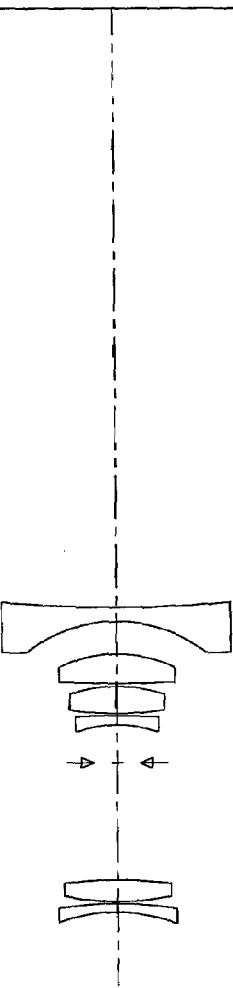
FIG. 2A
FIG. 2B
FIG. 2C

FIG.4A  FIG.4B  FIG.4C  FIG.4D
SPHERICAL ABERRATION  CURVATURE OF FIELD  DISTORTION  CHROMATIC ABERRATION OF MAGNIFICATION
FNO 5.892  FIY 21.63  FIY 21.63  FIY 21.63
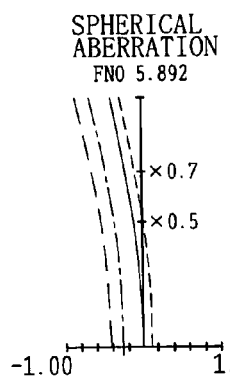 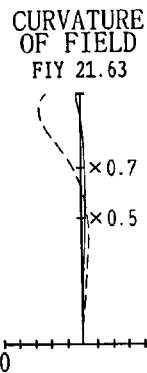 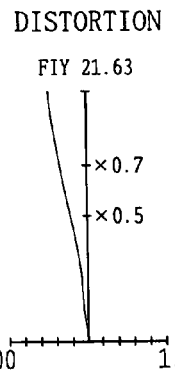 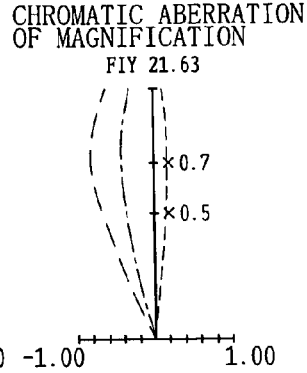
FIG.4E  FIG.4F  FIG.4G  FIG.4H
SPHERICAL ABERRATION  CURVATURE OF FIELD  DISTORTION  CHROMATIC ABERRATION OF MAGNIFICATION
FNO 9.115  FIY 21.63  FIY 21.63  FIY 21.63
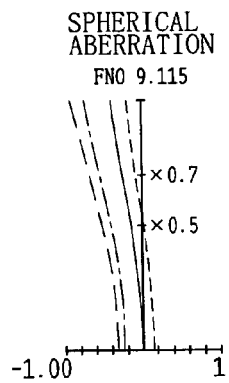 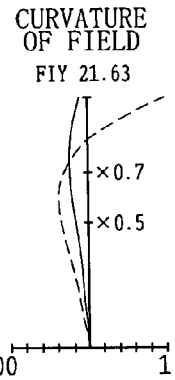 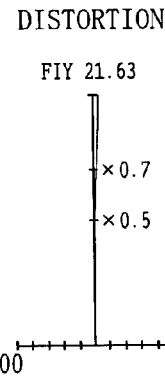 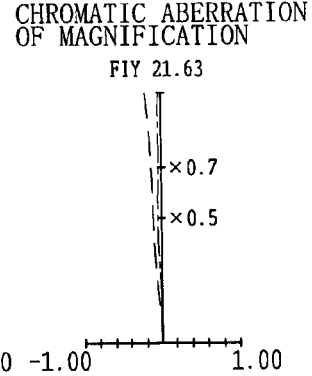
FIG.4I  FIG.4J  FIG.4K  FIG.4L
SPHERICAL ABERRATION  CURVATURE OF FIELD  DISTORTION  CHROMATIC ABERRATION OF MAGNIFICATION
FNO 13.427  FIY 21.63  FIY 21.63  FIY 21.63
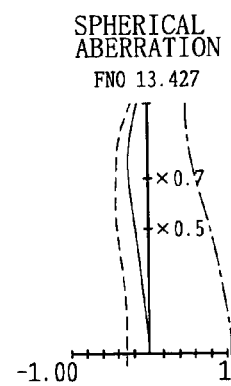 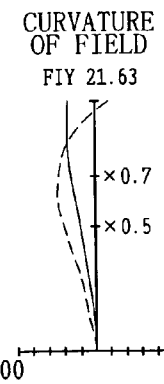 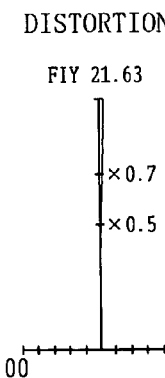 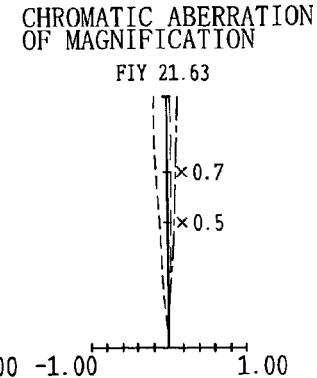
— — — — 435.84
— · — · — 486.13
— — — — 656.27
————— 587.56

FIG.5A SPHERICAL ABERRATION FNO 5.967

FIG.5B CURVATURE OF FIELD FIY 21.63

FIG.5C DISTORTION FIY 21.63

FIG.5D CHROMATIC ABERRATION OF MAGNIFICATION FIY 21.63

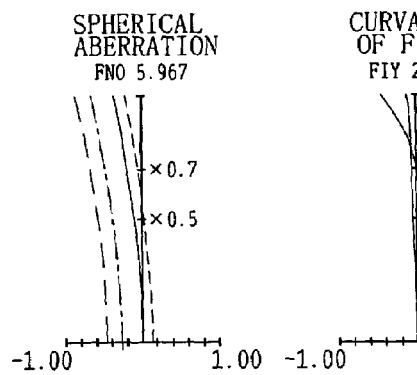
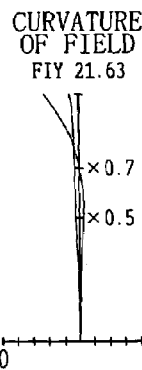
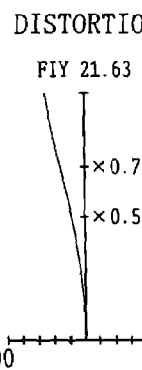
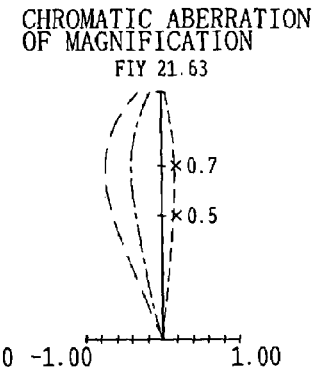

FIG.5E SPHERICAL ABERRATION FNO 9.213

FIG.5F CURVATURE OF FIELD FIY 21.63

FIG.5G DISTORTION FIY 21.63

FIG.5H CHROMATIC ABERRATION OF MAGNIFICATION FIY 21.63

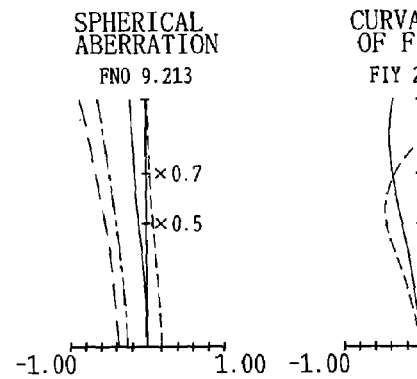
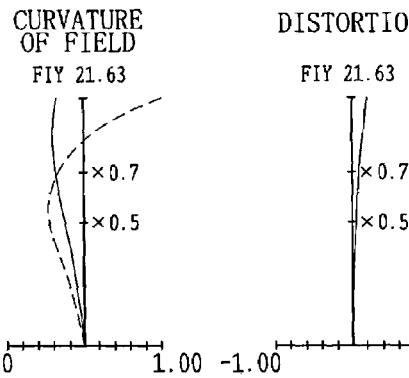
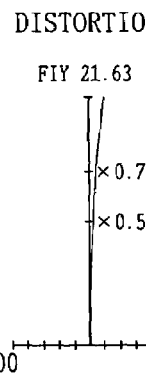
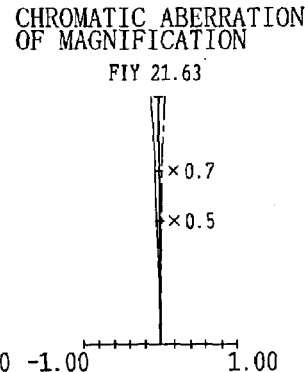

FIG.5I SPHERICAL ABERRATION FNO 13.444

FIG.5J CURVATURE OF FIELD FIY 21.63

FIG.5K DISTORTION FIY 21.63

FIG.5L CHROMATIC ABERRATION OF MAGNIFICATION FIY 21.63

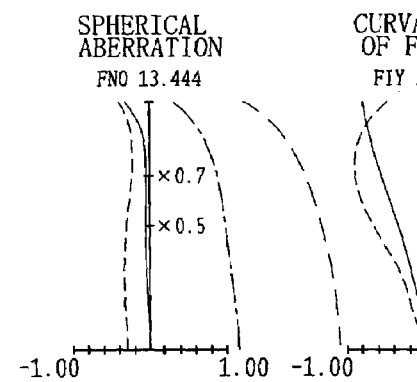
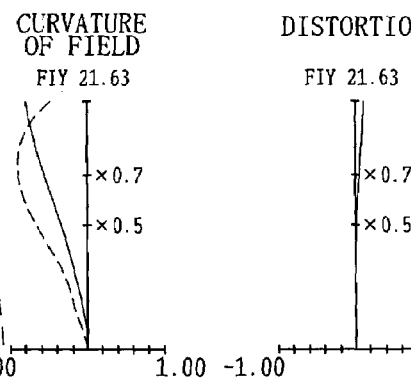
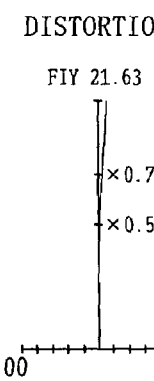
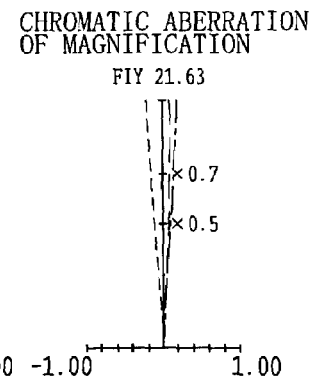

— — — — 435.84
— · · — · · — 486.13
— — — — — 656.27
———— 587.56

SPHERICAL
ABERRATION
FNO 5.584

CURVATURE
OF FIELD
FIY 21.63

DISTORTION
FIY 21.63

CHROMATIC ABERRATION
OF MAGNIFICATION
FIY 21.63

SPHERICAL
ABERRATION
FNO 3.464

CURVATURE
OF FIELD
FIY 21.63

DISTORTION
FIY 21.63

CHROMATIC ABERRATION
OF MAGNIFICATION
FIY 21.63

SPHERICAL
ABERRATION
FNO 12.907

CURVATURE
OF FIELD
FIY 21.63

DISTORTION
FIY 21.63

CHROMATIC ABERRATION
OF MAGNIFICATION
FIY 21.63

```
----   435.84
-·-·-  486.13
-----  656.27
─────  587.56
```

ZOOM LENS AND IMAGING APPARATUS USING THE SAME

This application claims priority to Japanese Patent Application No. 2003-310160 filed 2 Sep. 2003, the content of which is incorporated herein by reference in its entirety.

BACKGROUND OF THE INVENTION

1. Field of the Invention

The present invention relates to a zoom lens and an imaging apparatus using the zoom lens, in particular, a three-unit zoom lens suitable for compact cameras, which is small sized, has a high zoom ratio and has a wide angle of view.

2. Description of the Related Art

Conventionally, as a zoom lens for compact cameras, a two-unit zoom lens with simple composition has been widely used. However, in the zoom lens for compact cameras, demands for miniaturization and high zoom ratio have been increased in recent years.

Especially on the occasion of zooming, a demand for making a wide field angle at a short focal length end is increasing. For this purpose, in a two-unit zoom lens with simple composition, there is a limit in obtaining a balance of good aberration from the short focal length end to a long focal length end, and accordingly a three-unit zoom lens has been widely used.

Furthermore, a telephoto-type lens system in which the last lens group has negative composition has been widely used, because it has merits that necessity to keep a long back focus is low and the total length of the lens system can be shortened in the lens system for compact cameras, which is different from the case of a lens system for single-lens reflex cameras.

Especially, in a three-unit zoom lens, positive-positive-negative lens composition is widely used since it is effective for shortening the total length of the lens system at the long focal length end.

As such examples, a small-sized zoom lens having high zoom ratio has been proposed in Publications of Unexamined Patent Application of Japan, such as Toku Kai No. 2002-258158, Toku Kai No.2000-66103, Toku Kai Hei No.11-295600, Toku Kai Hei No. 11-52232, Toku Kai No. 2002-98894, the specification of the U.S. Pat. No. 6,236,515 and the like.

SUMMARY OF THE INVENTION

The imaging apparatus according to the present invention comprises, a zoom lens and a field stop for determining an extent of an imaging field, arranged at an object side of the zoom lens, the zoom lens comprising in order from the object side, a first lens group having positive refracting power, a second lens group having at least three lens elements and having positive refracting power, and a third lens group consisting of one single lens element and having negative refracting power, wherein zooming from a short focal length end to a long focal length end is performed by moving each of the lens groups to the object side, and the following conditions are satisfied:

$$3.0 < ft/fw$$

$$0.7 < IH/fw < 0.9$$

$$1.75 < ft/fl\_G1 < 2.5$$

$$2.8 < fw/sk\_w < 4.1$$

where ft is a focal length at the long focal length end, fw is a focal length at the short focal length end, IH is a maximum image height, fl_G1 is a composite focal length of the first lens group, and sk_w is a backfocus at the short focal length end.

The imaging apparatus according to the present invention comprises, a zoom lens and a field stop for determining an extent of an imaging field, arranged at an object side of the zoom lens, the zoom lens comprising in order from the object side, a first lens group having positive refracting power, a second lens group having positive refracting power and having at least two lens elements, and a third lens group having negative refracting power and consisting of one single lens element, wherein zooming from a short focal length end to a long focal length end is performed, by moving each of the lens groups to the object side, and the following conditions are satisfied $$3.0 < ft/fw$$

$$0.7 < IH/fw < 0.9$$

$$0.6 < |fl\_L2ob/fl\_L2im| < 1.0$$

where ft is a focal length of the long focal length end, fw is a focal length of the short focal length end, IH is a maximum image height, fl_L2 ob is a focal length of a lens at utmost object side in the second lens group, and fl_L2 im is a focal length of a lens at utmost image side in the second lens group.

The imaging apparatus according to present invention comprises, a zoom lens and a field stop for determining an extent of an imaging field, arranged at an object side of the zoom lens, the zoom lens comprising in order from the object side, a first lens group having positive refracting power, a second lens group having positive refracting power and having at least three lens elements and a third lens group having negative refracting power and consisting of one single lens element, wherein an aperture stop is arranged between the first lens group and the second lens group, and zooming from a short focal length end to a long focal length end is performed by moving each of the lens groups to the object side, and the following conditions are satisfied:

$$3.0 < ft/fw$$

$$0.7 < IH/fw < 0.9$$

where ft is a focal length of the long focal length end, fw is a focal length of the short focal length end, and IH is a maximum image height.

The zoom lens according to the present invention comprises, in order from an object side, a first lens group having positive refracting power, a second lens group having positive refracting power and having at least three lens elements, and a third lens group having negative refracting power and consisting of one single lens element, wherein zooming from a short focal length end to a long focal length end is performed by moving each of the lens groups to the object side, and the following conditions are satisfied:

$$1.75 < ft/fl\_G1 < 2.5$$

$$0.6 < |fl\_L2ob/fl\_L2im| < 1.0$$

where ft is a focal length of the long focal length end, fw is a focal length of the short focal length end, fl_G1 is a composite focal length of the first lens group, fl_L2ob is a focal length of a lens at utmost object side in the second lens group, and fl_Lim is the focal length of a lens at utmost image side of the second lens group.

The wide angle zoom lens and the imaging apparatus equipped with the same according to the present invention can realize to provide a wide angle zoom lens and an imaging apparatus equipped with the same which have an excellent performance with a small number of lens composition, while it is small sized, and it has a high zoom ratio and a wide angle of field.

These and other features and advantages of the present invention will become apparent from the following detailed description of the preferred embodiments when taken in conjunction with the accompanying drawings.

BRIEF DESCRIPTION OF THE DRAWINGS

FIGS. 2A, 2B and 2C are sectional views showing an optical arrangement developed along the optical axis at a short focal length end, a middle position and a long focal length end respectively, in a second embodiment of a wide zoom lens optical system according to the present invention.

FIGS. 4A to 4D, 4E to 4H, and 4I to 4L are aberration diagrams showing spherical aberration, curvature of field, distortion and magnification achromatic aberration at a short focal length end, a middle position and a long focal length end respectively, in the first embodiment.

FIGS. 5A to 5D, 5E to 5H, and 5I to 5L are aberration diagrams showing spherical aberration, curvature of field, distortion and magnification achromatic aberration at a short focal length end, a middle position and a long focal length end respectively, in the second embodiment.

DETAILED DESCRIPTION OF THE PREFERRED EMBODIMENTS

Figures 1A, 1B, 1C:
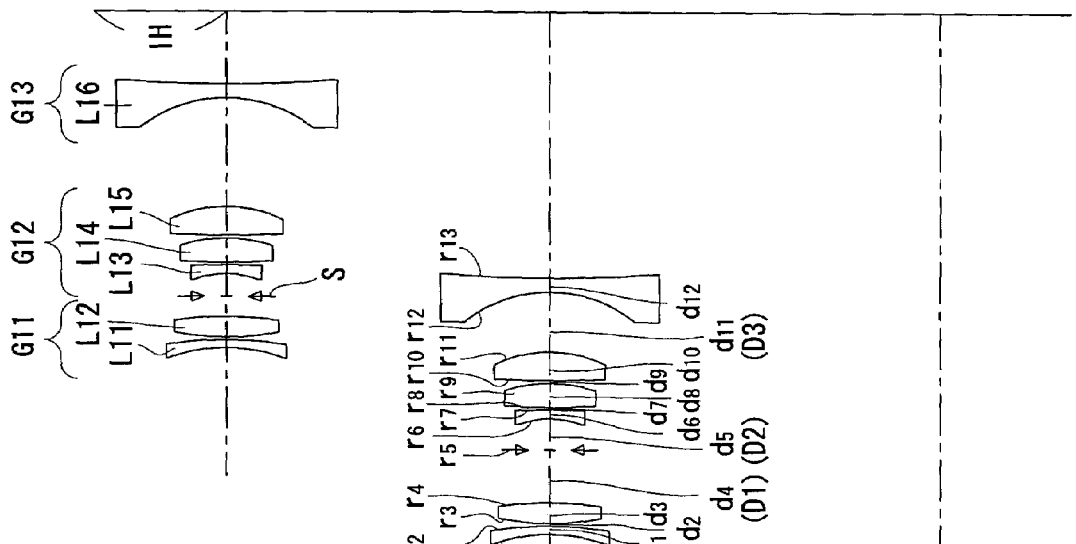
FIGS. 1A, 1B and 1C are sectional views showing an optical arrangement developed along the optical axis at a short focal length end, a middle position and a long focal length end respectively, in a first embodiment of a wide zoom lens optical system according to the present invention.

Prior to explaining embodiments, reasons why the composition of the present invention has been made as well as functions and advantages of the present invention will be explained.

The imaging apparatus according to the first invention of the present application comprises a zoom lens and a field stop for determining an extent of an imaging field, arranged at an object side of the zoom lens, the zoom lens comprising in order from the object side, a first lens group having positive refracting power, a second lens group having at least three lens elements and having positive refracting power, and a third lens group onsisting of one single lens element and having negative refracting power, wherein zooming from a short focal length end to a long focal length end is performed by moving each of the lens groups to the object side, and the following conditions are satisfied:

$$3.0 < ft/fw \tag{1}$$

$$0.7 < IH/fw < 0.9 \tag{2}$$

$$1.75 < ft/fl\_G1 < 2.5 \tag{3}$$

$$2.8 < fw/sk\_w < 4.1 \tag{4}$$

where ft is a focal length at the long focal length end, fw is a focal length at the short focal length end, IH is a maximum image height, fl_G1 is a composite focal length of the first lens group, and sk_w is a backfocus at the short focal length end.

The imaging apparatus according to the second invention of the present application comprises a zoom lens and a field stop for determining an extent of an imaging field, arranged at an object side of the zoom lens, the zoom lens comprising in order from the object side, a first lens group having positive refracting power, a second lens group having positive refracting power and having at least two lens elements, and a third lens group having negative refracting power and consisting of one single lens element, wherein zooming from a short focal length end to a long focal length end is performed, by moving each of the lens groups to the object side, and the following conditions are satisfied $$3.0 < ft/fw \tag{1}$$

$$0.7 < IH/fw < 0.9 \tag{2}$$

$$0.6 < |fl\_L2ob/fl\_L2im| < 1.0 \tag{5}$$

where ft is a focal length of the long focal length end, fw is a focal length of the short focal length end, IH is a maximum image height, fl_L2ob is a focal length of a lens at utmost object side in the second lens group, and fl_L2 im is a focal length of a lens at utmost image side in the second lens group.

The imaging apparatus according to the third invention of the present application comprises, a zoom lens and a field stop for determining an extent of an imaging field arranged at an object side of the zoom lens, the zoom lens comprising in order from the object side, a first lens group having positive refracting power, a second lens group having positive refracting power and having at least three lens elements and a third lens group having negative refracting power and consisting of one single lens element, wherein an aperture stop is arranged between the first lens group and the second lens group, and zooming from a short focal length end to a long focal length end is performed by moving each of the lens groups to the object side and the following conditions are satisfied:

$$3.0 < ft/fw \tag{1}$$

$$0.7 < IH/fw < 0.9 \tag{2}$$

where ft is a focal length of the long focal length end, fw is a focal length of the short focal length end, and IH is a maximum image height.

The imaging apparatus according to the fouth invention of the present application comprises a zoom lens and a field stop for determining an extent of an imaging field, arranged at an object side of the zoom lens, the zoom lens comprising in order from the object side, a first lens group having positive refracting power, a second lens group having positive refracting power and a third lens group having negative refracting power and consisting of one single lens element, wherein zooming from a short focal length end to a long focal length end is performed by moving each of the lens groups to the object side, and an aperture stop which moves so as to increase a distance from the second lens group at the long focal length end rather than at the short focal length end when the zooming from the short focal length end to the long focal length end is performed is arranged between the first lens group and the second lens group, and the following conditions are satisfied:

$$3.0 < ft/fw \qquad (1)$$

$$0.7 < IH/fw < 0.9 \qquad (2)$$

where ft is a focal length of the long focal length end, fw is a focal length of the short focal length end, and IH is a maximum image height The imaging apparatus according to the fifth invention of the present application is composed that in the imaging apparatus according to the third invention or the fourth invention, focusing is performed by the second lens group, and the aperture stop remains fixed in a direction of an optical axis when the focusing is performed.

The imaging apparatus according to the sixth invention of the present application is composed that in the imaging apparatus according to one of the first to fourth inventions, a single lens element composing the third lens group satisfies the following condition is satisfied:

$$nd\_G_3 > 1.61 \qquad (6)$$

where $nd\_G_3$ is a refractive index of the single lens element of the third lens group.

The imaging apparatus according to the seventh invention of the present application is composed that, in the imaging apparatus according to one of the first to fourth inventions, the first lens group comprises in order from the object side, a meniscus lens element having negative refracting power and a concave surface directed toward the object side, and a lens element having positive refracting power.

The imaging apparatus according to the eighth invention of the present application is composed that, in the imaging apparatus according to one of the first to fourth inventions, a distance between the first lens group and the second lens group increases, and a distance between the second lens group and the third lens group decreases at the long focal length end in comparison to at the short focal length end.

The zoom lens according to the ninth invention of the present application comprises, in order from an object side, a first lens group having positive refracting power, a second lens group having positive refracting power and having of at least three lens elements, and a third lens group having negative refracting power and consisting of a single lens element, wherein zooming from a short focal length end to a long focal length end is performed by moving each of the lens groups to the object side, and the following conditions are satisfied:

$$1.75 < ft/fl\_G1 < 2.5 \qquad (3)$$

$$0.6 < |fl\_L2ob/fl\_L2im| < 1.0 \qquad (5)$$

where ft is a focal length of the long focal length end, fw is a focal length of the short focal length end, fl_G1 is a composite focal length of the first lens group, fl_L2ob is a focal length of a lens at utmost object side in the second lens group, and fl_Lim is the focal length of a lens at utmost image side of the second lens group.

The zoom lens according to the tenth invention of the present application is composed that, in the zoom lens according to the ninth invention, an aperture stop is arranged between the first lens group and the second lens group.

The zoom lens according to the eleventh invention of the present application is composed that, in the zoom lens of the tenth invention, the aperture stop moves so as to increase a distance between the first lens group and the second lens group at the long focal length end rather than at the short focal length end.

The zoom lens according to the twelfth invention of the present application, is composed that, in the zoom lens of the tenth invention, focusing is performed by moving the second lens group, and the aperture stop remains fixed in a direction of an optical axis when the focusing is performed.

The zoom lens according to the thirteenth invention of the present application is composed that, in the zoom lens of the ninth invention, the third lens group consists of only one sigle lens element, which satisfoes the following condition:

$$nd\_G_3 > 1.61 \qquad (6)$$

where $nd\_G_3$ is a refractive index of the single lens element of the third lens group The zoom lens according to the fourteenth invention of the present application is composed that, in the zoom lens according to the ninth invention, the first lens group comprises: in order from the object side, a meniscus lens element having negative refracting power and a concave surface directed toward the object side; and a lens element having positive refracting power.

The zoom lens according to the fifteenth invention of the present application is composed that in the zoom lens according to the ninth invention, a distance between the first lens group and the second lens group increases, and a distance between the second lens group and the third lens group decreases at a long focal length end in comparison to at a short focal length end.

The imaging apparatus according to the sixteenth invention of the present application comprises the zoom lens according to the ninth invention and a view frame (field stop) for determining an extent of an imaging field arranged at an image side of the zoom lens.

The imaging apparatus according to the seventeenth invention of the present application is composed that in the imaging apparatus according to the seventh invention, a total number of lenses in the first lens group is two.

The zoom lens according to the eighteenth invention of the present application is composed that in the imaging apparatus according to the forteenth invention, a total number of lenses in the first lens group is two.

The imaging apparatus according to the nineteenth invention of the present application is composed that in the imaging apparatus according to one of the first to fourth inventions, a total number of lenses in the second lens group is three.

The zoom lens according to the twentieth invention of the present application is composed that in the imaging apparatus according to the fourteenth inventions, a total number of lenses in the second lens group is three.

The imaging apparatus according to the first invention comprises, a zoom lens and a field stop for determining an extent of an imaging field, arranged at an object side of the zoom lens, the zoom lens comprising in order from the object side, a first lens group having positive refracting power, a second lens group having at least three lens elements and having positive refracting power, and a third lens group consisting of one single lens element and having negative refracting power. Here, zooming from a short focal length end to a long focal length end is performed by moving each of the lens groups to the object side, and the conditions (1) to (4) mentioned above are satisfied.

According to the first invention mentioned above, by making the third lens group consist of a single lens element, it becomes possible to realize a zoom lens having overall high value as an optical system. In the first invention mentioned above, the second lens group has at least three lenses. This is because it is important that correction of aberration is made well in each lens group for achieving a high zoom ratio. In a three-unit zoom lens having positive-positive-negative power arrangement, the second lens group has a role for achieving main convergence effect, and accordingly it is a lens group having strong power inevitably. It is not desirable to achieve the convergence effect of this group by using only one lens having positive refracting power, since the power becomes strong too much and it becomes impossible to suppress generation of an aberration, particularly spherical aberration. From a viewpoint of correction of chromatic aberration, an achromatic effect by a lens having positive refracting power and a lens having negative refracting power becomes indispensable. In the light of these mentioned above, in the present invention the second lens group comprises at least three lenses. It is much more desirable that this lens group comprises at least two lenses having positive refracting power and at least one lens having negative refracting power.

In the first invention mentioned above, its purpose will be realized by composing so that each condition mentioned above (1) to (4) will be satisfied. It is not desirable if the conditions are not satisfied, since problems which will be explained below may arise.

First of all, the condition (1) will be explained. This condition (1) specifies the zoom ratio (the ratio of the focal distance of the whole system of the maximum long focal length end to the focal distance of the whole system of the maximum short focal length end: ft/fw), and it is one of fundamental conditions in a zoom optical system having a high zoom ratio.

By taking the highest value as much as possible within a range satisfing the condition (1), the width of the field angle within which photographing can be carried out increases, and accordingly, the usefulness as a camera improves since photographing becomes possible at various field angles.

If the value of ft/fw becomes lower than the minimum limit in the condition (1), although aberration correction in the entire range of zoom system will become easy, the zoom ratio becomes no longer high. This is different from the zoom ratio which the present invention aims. Moreover, aberration correction becomes easy even if the first lens group is not composed as the same as that of the present invention. Accordingly, in respect of cost and magnitude, it is not desirable to compose the first lens group with lens composition like that of the present invention since the number of lenses becomes excessive on the contrary. That is, if it is less than the minimum of the condition (1), it becomes unable to achieve a high zoom ratio which is one of purposes of the present invention. Therefore, the necessity of using composition of the present invention is lost.

As to ft/fw, the lower limit of it may be set to 3.5, and furthermore, it is good to be set to 3.8. When a maximum value is established, it is good that the maximum value is set to 5.5, and furthermore, it may be set not to exceed 5.0. This becomes advantageous to the miniaturization of the total length at the telephoto end.

That is, it is more desirable that one of the following conditions (11) to (14) are satisfied:

$$3.5 < ft/fw < 5.5 \tag{11}$$

$$3.5 < ft/fw < 5.0 \tag{12}$$

$$3.8 < ft/fw < 5.5 \tag{13}$$

$$3.8 < ft/fw < 5.0 \tag{14}$$

The condition (2) restricts the value according to the field angle at the short focal length end. If it is less than the minimum limit, it will not have attained the wide angle zoom that is one of the purposes of the present invention.

If it exceeds the maximum limit, it becomes impossible to suppress generation of an aberration off the axis, and correction of the aberration becomes impossible.

As to IH/fw of the condition (2), it is good to be set to 0.72 and further it is also good to be set to 0.76. Moreover, it is good that the maximum value is set to 0.88, and it is still better also to be set to 0.8. That is, it is more desirable that one of the following conditions (21) to (24) is satisfied.

$$0.72 < IH/fw < 0.88 \tag{21}$$

$$0.72 < IH/fw < 0.8 \tag{22}$$

$$0.76 < IH/fw < 0.88 \tag{23}$$

$$0.76 < IH/fw < 0.8 \tag{24}$$

The condition (3) expresses the ratio of the focal length of the first lens group and the focal length of the whole system at the long focal length end.

When it is less than the minimum limit, it means that the power of the first lens group is weak, and the telephoto ratio cannot be small. This will cause increase of the total length at the long focal length end. Accordingly, it becomes difficult to realize a small-sized zoom lens. If it exceeds the maximum limt, it becomes difficult to suppress generation of chromatic aberration, especially the axial chromatic aberration.

As to ft/fl_G1 of the condition (3), it is good that the minimum value is set to 1.8 and further it is also good to be set to 1.85. Moreover, it is good that the maximum value is set to 2.4, and it is still better also to be set to 2.3.

That is, it is more desirable that one of the following conditions (31) to (34) is satisfied.

$$1.80 < ft/fl\_G1 < 2.4 \tag{31}$$

$$1.80 < ft/fl\_G1 < 2.3 \tag{32}$$

$$1.85 < ft/fl\_G1 < 2.4 \tag{33}$$

$$1.85 < ft/fl\_G1 < 2.3 \tag{34}$$

The condition (4) is a conditional expression that specifies a suitable back focus at the short focal length end. If it exceeds the maximum limit, the back focus at the short focal length end will become short too much, and it will cause increase of the diameter of the third lens group unnecessarily. When it is less than the minimum limit, the power of the third lens group increases and the lateral magnification of the third lens group is made to increase. By this, focal sensitivity becomes high and it becomes difficult to guarantee an accuracy of focusing or the like. Accordingly, this is not desirable in manufacturing.

As to fw/sk_w of the condition (4), it is good that the minimum value is set to 3.0 and further it is also good to be set to 3.2. Further, it is good that the maximum value is set to 3.9 and it is still better also to be set to 3.75. That is, it is more desirable that one of the following conditions (41) to (44) is satisfied.

$$3.0 < fw/sk\_w < 3.9 \quad (41)$$

$$3.0 < fw/sk\_w < 3.75 \quad (42)$$

$$3.2 < fw/sk\_w < 3.9 \quad (43)$$

$$3.2 < fw/sk\_w < 3.75 \quad (44)$$

In the imaging apparatus according to the second invention, by making the third lens a single lens element as in the case of the first invention, movable ranges of the second and third lens groups at the time of zooming are secured, and the power of each lens group can be suppressed. Moreover, it is required that the second lens group have at least two lenses and the condition (5) besides the conditions (1) and (2) are satisfied.

This defines the conditions for distributing the convergence effect, which the second lens group should bear appropriately, in the second lens group. When it is less than the minimum limit, it means that the power of the lens arranged at the image side of the second lens group becomes weak relatively. Then the principal point position in the second lens group moves toward the object side, and it becomes difficult to secure the distance between the second and third lens groups at the time of zooming, and accordingly it becomes a hinderance to a high zoom ratio. When it exceeds the maximum limit, it means that the power of the lens arranged at the image side of the second lens group becomes strong too much relatively, and it becomes difficult to suppress generation of spherical aberration and the like. As to the conditions (1) and (2), explanations have been made previously.

As to |fl_L2ob/fl_L2im | of the condition (5), it is good to be set to 0.7 and further it is also good to be set to 0.75. Moreover, it is good that the maximum value is set to 0.95, and it is still better also to be set to 0.9. That is, it is more desirable that one of the following conditions (51) to (54) is satisfied.

$$0.7 < |fl\_L2ob/fl\_L2im| < 0.95 \quad (51)$$

$$0.7 < |fl\_L2ob/fl\_L2im| < 0.9 \quad (52)$$

$$0.75 < |fl\_L2ob/fl\_L2im| < 0.95 \quad (53)$$

$$0.75 < |fl\_L2ob/fl\_L2im| < 0.9 \quad (54)$$

The imaging apparatus of the third invention comprises an aperture stop arranged between the first lens group and the second lens group, whrein the second lens group has at least three lens elements and the third lens group consists of a single lens element. By composing the third lens group with a single lens element as in the case in the first invention, it is possible to secure movable ranges of the second and third lens groups at the time of zooming, and to suprress the power of each group. As in the case of the first invention, the second lens group comprises at least three lens elements. Furthermore, the conditions (1) and (2) are satisfied.

In the third invention, the aperture stop is arranged between the first lens group and the second lens group as mentiond above. In case of a three-unit zoom, in many cases an aperture stop is arranged at an object side of the second lens group, in the second lens group, at an image side of the second lens group etc.

Although there is a merit that the third lens group can be made small when the aperture stop is arranged at the image side of the second lens group, it causes that the incident pupil becomes long and the diameter of the first lens group increases. This brings a factor of further enlarging size since securing of the rim thickness of the lens having positive refracting power, arranged in the first lens group becomes difficult, and in order to secure the rim thickness, it becomes enevitable to keep thickness which is unnecessary in aberration correction. Moreover, there is a demerit that a curvature of field by fluctuation of focusing is large. This is because a chief ray off the axis takes a large angle of incidence to the third lens group compared with other composition. This phenomenon is notably seen, particularly at the short focal length end and that is very undesirable for a wide angle zoom.

Composition such that an aperture stop is arranged in the second lens group is an approximately symmetrical system optically. Accordingly it is advantageous to correction of an aberration and miniaturization. However, owing to a complicated shutter mechanism, the second lens group is made devided. This causes an increase of core portion in the group, and furthermore, brings a great risk from viewpoints of productivity and efficiency on repair. In view of these mentioned above, in the third invention an aperture stop is arranged at the object side of the second lens group.

In the imaging apparatus according to the fourth invention, by making the third lens a single lens element as in the case of the first invention, movable ranges of the second and third lens groups at the time of zooming is secured, and the power of each lens group can be suppressed. The aperture stop is arranged at the object side of the second lens group like the case of the third invention. Further, the aperture stop moves so as to increase the distance to the second lens group when zooming is performed from the short focal length end to the long focal length end.

Arranging closely the second lens group and the aperture stop at the short focal length end is effective in reduction of diameters of the second lens group and the third lens group since an amount of departure of off axial light from the optical axis can be made small.

However, at the long focal length end, the diameters become large for securing a luminous flux off the axis of the first lens group since the distance between the first lens group and the aperture stop increases. Particularly, in case of a zoom lens having a large zoom ratio, increase of the distance between the first lens group and the aperture stop is regarded as questionable. The movement of the aperture stop leads to suppression of this problem.

When the aperture stop is arranged in the second lens group, in connection with the structure of a lens frame, it is necessary to put a shutter mechanism in the second lens group. The distance between the second lens group and the third lens group which decreases at the long focal length end has made it difficult to keep a space necessary for a shutter mechanism. This has been a serious restriction for securing the zoom ratio. But, this problem can be solved by arranging an aperture stop so as to depart from the second lens group at the long focal length end as seen in the present invention, and it becomes an effective means for a high zoom ratio.

In the imaging apparatus according to the fifth invention, focusing is performed by moving the second lens group in one of the first invention to the fourth invention, and the aperture stop remains fixed. In the three-unit zoom of the present invention, the second lens group arranged near the aperture stop has the smallest diameter, and accordingly, this enables to make the simplest mechanism for performing the focusing. Furthermore, in this case, by fixing the aperture stop, a complicated shutter mechanism and a complicated drive mechanism for focusing can be composed separately, and driving force necessary for performing the focusing can also be made small. Furthermore, since the aperture stop is not driven at the time of focusing, there is a merit also in prevention of light leak from lens frame etc. Moreover, since the drive is carried out only in the inner portion of the lens frame at the time of focussing, it becomes an effective means for providing a waterproofing mechanism of the lens frame.

The imaging apparatus according to the sixth invention or the seventh invention satisfies the condition (6) with respect to a single lens element composing the third lens group, in one of the first to fifth inventions.

In making wide angle of view and a high zoom ratio of the imaging apparatus, fluctuation of the zoom ratio of the third lens group becomes large. It becomes also necessary to make refracting power of the third lens group strong for promoting miniaturization. There is no way except enlarging the curvature or increasing the refractive index of the lens for keeping the refracting power of the third lens group which consists of a single lens element. When increasing curvature, it becomes impossible to correct astigmatism and distortion at the short focal length end. Then, it is desirable to set the refractive index of the third lens group high for realizing a good correction of aberration.

That is, if it is less than the minimum limit of condition (6), achieving a good correction of aberration becomes difficult.

With respect to $nd\_G_3$ of the condition (6), the minimum limit may be set to 1.65 and it is also good to set to 1.68. Moreover, the maximum value can be set. It can be set to 1.85, or it can be also set not to exceed 1.8. Thus, by composing such, it becomes advantageous in manufacturing cost.

That is, it is much more desirable that one of the following conditions (61) to (64) is satisfied.

$$1.85 > nd > G_3 > 1.65 \quad (61)$$

$$1.85 > nd > G_3 > 1.68 \quad (62)$$

$$1.80 > nd > G_3 > 1.65 \quad (63)$$

$$1.80 > nd > G_3 > 1.68 \quad (64)$$

The imaging apparatus according to the eighth invention is composed such that the distance between the first lens group and the second lens group increases and the distance between the second lens group and the third lens group decreases at the long focal length end in comparison to at the short focal length end in the imaging apparatus mentioned above. This is advantageous for achieving a high zoom ratio since zooming action can be shared with both of the second lens group and the third lens group by such composition.

Each of the ninth to fourteenth inventions is a zoom lens satisfying the conditions (3) and (5).

By this composition, as explained previously, it is advantageous to miniaturization and correction of aberration, even if the zoom lens has a large wide angle of view at the short focal length end and a high zoom ratio. With respect to the conditions (3) and (5), explanations are the same as mentioned before.

The zoom lens of the fifteenth invention is advantageous for achieving a high zoom ratio since a zooming action can be shared with both of the second lens group and the third lens group, as in the case of the imaging apparatus of the eighth invention.

The imaging apparatus of the sixteenth invention comprises the zoom lens mentiond above and a view frame arranged at the image side of the zoom lens. Thereby, an extent of an imaging field can be appropriately set on the image surface.

In addition, in the zoom lens according to the present invention and an imaging apparatus equipped with the same, they can be composed by combining suitably the conditions satisfying each condition mentioned above In one of the inventions mentioned above, it is more desirable to satisfy the following condition (65).

$$4.0 < S23/fw < 7.0 \quad (65)$$

where S23 represents the air space at the optical axis of the second lens group and the third lens group when focusing is performed at the infinite-distance object point in the short focal length, and fw represents the focal length of the whole system in the short focal length.

In the condition (65), when S23/fw is less than the minimum limit, the space for movement of each lens group becomes small, and it becomes difficult to achieve a high zoom ratio. If it exceeds the maximum limit mentioned above, the total length of the lens system at the short focal length becomes easily large.

Furthermore, it is more desirable that the minimum limt is set to 4.2 and further 4.4, for achieving a high zoom ratio.

In respect of miniaturization, it is more desirable that the maximum limit is set to 6.0 and much desirably to 5.5.

In one of the inventions mentioned above, when it is composed such that an aperture stop is arranged between the first lens group and the second lens group and the distance between the aperture stop and the second lens group increases at the long focal length end rather than at the short focal length end, and that focusing is performed by moving the second lens group only, it is desirable that the following conditions (66) and (67) are satisfied $$0.03 < (Ss2t - Ss2w)/fw < 0.15 \quad (66)$$

$$0.02 < Ss2w/fw < 0.15 \quad (67)$$

where Ss2w represents the distance between the aperture stop and the second lens group when focusing is performed at the infinite-distance object point in the short focal length end, Ss2t represents the distance between an aperture stop and the second lens group when focusing is performed at the infinite-distance object point in the long focal length end, and fw represents the focal length of the whole system at the short focal length end.

By arranging that the aperture stop between the first lens group and the second lens group, increase of the diameter of the first lens group can be supressed, and it can be assembled with sufficient accuracy in manufacturing rather than a case where the aperture stop is arranged into the second lens group. On the other hand, it is desirable to arrange the aperture stop near the second lens group in order to suppress increase of the diameter of the third lens group. In this case, if focusing is performed by movement of the second lens group only, the space for the focussing movement of the second lens group at the long focal length end becomes small. Therefore, it is desirable that the aperture stop is moved according to zooming in order to keep the space.

The conditions mentioned above specify desirable conditions when the aperture stop is moved according to the amount of focusing movement of the second lens group. The condition (66) specifies the amount of change of the distance between the aperture stop and the second lens group at the time of zooming. When it exceeds the minimum limit, the amount of distance change becomes small. Accordingly it becomes difficult to keep the space necessary for focussing movement of the second lens group at the long focal length end. If it exceeds the maximum limit, the amount of distance change becomes large too much, and it becomes difficult to keep brightness at the long focal length end.

The condition (67) specifies the distance between the aperture stop and the second lens group at the short focal length end. If it exceeds the minimum limit, the distance between the aperture stop and the second lens group becomes small. Accordingly, it becomes difficult to make the very close range small. On the other hand, if it exceeds the maximum limit, the diameter of the third lens group becomes easy to increase since the aperture stop departs from the second lens group.

The minimum limit of the condition (66) can be set to 0.04 and further 0.05. On the other hand, the maximum value can be set to 0.11 and further to 0.09.

Also, the minimum limit of the condition (67) can be set to 0.05 and further to 0.07. On the other hand, the maximum value can be set to 0.12 and further set to 0.10.

Hereafter, embodiments of the present invention will be explained using drawings.

The First Embodiment

FIGS. 1A, 1B and 1C are sectional views showing an optical arrangement developed along the optical axis at a short focal length end, a middle position and a long focal length end respectively, of the zoom lens in the first embodiment according to the present invention. FIGS. 4A to 4D, 4E to 4H and 4I to 4L are aberration diagrams showing spherical aberration, curvature of field, distortion and achromatic aberration of magnification at the short focal length end, the middle position and the long focal length end respectively.

As shown in FIG. 1, the wide angle zoom lens of the first embodiment comprises in order from an object side, a first lens group G11, an aperture stop S, a second lens group G12 and a third lens group G13.

The first lens group G11 comprises in order from the object side, a meniscus lens L11 having negative refracting power and a concave surface directed toward the object side, and a lens L12 having positive refracting power and double convex surfaces. The second lens group G12 comprises in order from the object side, a meniscus lens L13 having negative refracting power and a concave surface directed toward the object side, and lenses L14 and L5, each of which has positive refracting power and double convex surfaces. The third lens group G13 comprises a lens L16 having negative refracting power and a concave surface directed toward the object side.

The aperture stop S is arranged between the first lens group G11 and the second lens group G12. Aspherical surfaces are formed on the surface at the image side of the lens L15 in the second lens group G12 and the surface at the object side of the lens L16 in the third lens group G13, respectively.

In case that zooming is carried out from the short focal length end to the long focal length end when focusing is performed at the infinite-distance object point, the aperture stop S, the first lens group G11, the second lens group G12 and the third lens group G13 are moved together toward the object side so as to widen the distance between the first lens group G11 and the second lens group G12.

At the same time, the second lens group G12 and the third lens group G13 are moved toward the object side so as to reduce the distance between the second lens group G12 and the third lens group G13.

It is desirable that at the time of focusing at a short-distance object point, focusing from the infinite distance to the very close distance is performed by moving the second lens group G12 from the image side to the object side, and meanwhile the aperture stop S remains fixed.

Next, numerical data of optical elements composing the zoom lens system of the first example are shown.

In the numerical data, $r_1$, $r_2$, ... denote radii of curvature of individual lens surfaces; $d_1$, $d_2$, ... denote thickness of individual lenses or air space between them; $n_{d1}$, $n_{d2}$, ... denote refractive indices of individual lenses at the d line; $v_{d1}$, $v_{d2}$, ... denote Abbe's numbers of individual lenses; Fno. denotes an F number; f denotes the total focal length of the zoom lens system, and D0 denotes the distance from an object to the first lens surface.

When z is taken as the coordinate in the direction of the optical axis, y is taken as the coordinate orthogonal to the optical axis, K as a conic constant, and $A_4$, $A_6$, $A_8$, $A_{10}$, as aspherical coefficients, the configuration of each of the aspherical surfaces is expressed by the following equation:

$$Z=(y^2/r)/[1+\{1-(1+K)(y/r)^2\}^{1/2}]+A_4y^4+A_6y^6+A_8y^8+A_{10}y^{10}$$

These symbols are commonly used in the embodiments to be described later.

Numerical data 1

| | | |
|---|---|---|
| $r_1 = -19.081$ | $d_1 = 1.00$ | $n_{d1} = 1.67270$  $v_{d1} = 32.10$ |
| $r_2 = -38.040$ | $d_2 = 0.20$ | |
| $r_3 = 23.222$ | $d_3 = 2.46$ | $n_{d3} = 1.48749$  $v_{d3} = 70.23$ |
| $r_4 = -34.496$ | $d_4 = D1$ | |
| $r_5 = \infty$ (aperture stop) | $d_5 = D2$ | |
| $r_6 = -10.580$ | $d_6 = 1.00$ | $n_{d6} = 1.72916$  $v_{d6} = 54.68$ |
| $r_7 = -72.938$ | $d_7 = 0.23$ | |
| $r_8 = 73.863$ | $d_8 = 2.81$ | $n_{d8} = 1.51823$  $v_{d8} = 58.90$ |
| $r_9 = -15.671$ | $d_9 = 0.20$ | |
| $r_{10} = 116.920$ | $d_{10} = 3.30$ | $n_{d10} = 1.58313$  $v_{d10} = 59.46$ |
| $r_{11} = -13.127$ (aspherical surface) | $d_{11} = D3$ | |
| $r_{12} = -12.183$ (aspherical surface) | $d_{12} = 1.50$ | $n_{d12} = 1.69350$  $v_{d12} = 53.18$ |
| $r_{13} = 175.199$ | | |
| P = image surface | | | aspherical coefficient the eleventh surface $K = 0$  $A_4 = 9.5186 \times 10^{-5}$  $A_6 = 5.5869 \times 10^{-7}$
      $A_8 = -6.9259 \times 10^{-9}$  $A_{10} = 1.2356 \times 10^{-10}$ the twelfth surface $K = 0$  $A_4 = 1.0076 \times 10^{-4}$  $A_6 = 1.7893 \times 10^{-7}$
      $A_8 = -7.6886 \times 10^{-10}$  $A_{10} = 2.3066 \times 10^{-11}$ Zoom Data
The field in the first embodiment are shown below.

| (full angle of field = 2ω°) | | | |
|---|---|---|---|
| | short focal length end | middle focal length position | long focal length end |
| | 74.9 | 40.8 | 21.1 |
| when D0 (distance to the first surface from an object) is ∞: | | | |
| f (mm) | 28.94 | 58.0 | 115.8 |
| Fno. | 5.9 | 9.1 | 13.4 |
| D1 | 2.34 | 5.86 | 12.29 |
| D2 | 2.55 | 3.66 | 4.77 |
| D3 | 12.54 | 7.08 | 3.45 |
| when D0 (distance to the first surface from an object) is 60 cm: | | | |
| f(mm) | 28.94 | 58.0 | 115.8 |
| Fno | 5.9 | 9.1 | 13.4 |
| D1 | 2.34 | 5.86 | 12.29 |
| D2 | 1.86 | 2.82 | 3.56 |
| D3 | 13.23 | 7.92 | 4.66 |

The Second Embodiment

FIGS. 2A, 2B and 2C are sectional views showing an optical arrangement developed along the optical axis at a short focal length end, a middle position and a long focal length end respectively of the zoom lens in the second embodiment according to the present invention. FIGS. 5A to 5D, 5E to 5H and 5I to 5L are aberration diagrams showing spherical aberration, curvature of field, distortion and achromatic aberration of magnification at the short focal length end, the middle position and the long focal length end, respectively in the second embodiment.

The wide angle zoom lens of the second embodiment has in order from an object side, a first lens group G21, an aperture stop S, a second lens group G22, and a third lens group G23, as shown in FIG. 2.

The first lens group G21 comprises in order from the object side, a meniscus lens L21 having negative refracting power and a concave surface directed toward the object side, and a lens L22 having positive refracting power and double convex surfaces. The second lens group G22 comprises in order from the object side, a meniscus lens L23 having negative refracting power and a concave surface directed toward the object side, and lenses L24 and L25, each of which has positive refracting power and double convex surfaces. The third lens group G23 comprises a lens L26 having negative refracting power and a concave surface directed toward the object side. The aperture stop S is arranged between the first lens group G21 and the second lens group G22.

Aspherical surfaces are formed on both surfaces of the lens L24 in the second lens group G22 and the surface at the object side of the lens L26 in the third lens group G13, respectively.

In case that zooming is carried out from the short focal length end to the long focal length end when focusing is performed at the infinite-distance object point, the aperture stop S, the first lens group G21, the second lens group G22 and the third lens group G23 are moved together toward the object side. At this time, the first lens group G21 moves so as to widen the distance to the second lens group G22.

At the same time, the second lens group G22 and the third lens group G23 are moved toward the object side so as to reduce the distance between the second lens group G22 and the third lens group G23. It is desirable that at the time of focusing at the short-distance object point, focusing from the infinite distance to the very close distance is performed by moving the second lens group G22 from the image side to the object side, and the aperture stop S remains fixed.

| Numerical data 2 | | | |
|---|---|---|---|
| $r_1 = -18.426$ | $d_1 = 1.00$ | $n_{d1} = 1.67270$ | $v_{d1} = 32.10$ |
| $r_2 = -36.743$ | $d_2 = 0.20$ | | |
| $r_3 = 24.426$ | $d_3 = 2.46$ | $n_{d3} = 1.48749$ | $v_{d3} = 70.23$ |
| $r_4 = -30.500$ | $d_4 = D1$ | | |
| $r_5 = \infty$ (aperture stop) | $d_5 = D2$ | | |
| $r_6 = -10.486$ | $d_6 = 1.00$ | $n_{d6} = 1.74100$ | $v_{d6} = 52.64$ |
| $r_7 = -104.115$ | $d_7 = 0.20$ | | |
| $r_8 = 42.619$ | $d_8 = 3.00$ | $n_{d8} = 1.51742$ | $v_{d8} = 52.43$ |
| $r_9 = -17.557$ | $d_9 = 0.20$ | | |
| $r_{10} = 127.054$ (aspherical surface) | $d_{10} = 3.35$ | $n_{d10} = 1.58313$ | $v_{d10} = 59.46$ |
| $r_{11} = -12.398$ (aspherical surface) | $d_{11} = D3$ | | |
| $r_{12} = -13.042$ (aspherical surface) | $d_{12} = 1.50$ | $n_{d12} = 1.74320$ | $v_{d12} = 49.34$ |
| $r_{13} = 177.614$ | | | |
| P = image surface | | | |

| aspherical surface coefficient | | |
|---|---|---|
| the tenth surface | | |
| $K = 0$ | $A_4 = -2.2952 \times 10^{-5}$ | $A_6 = 4.9641 \times 10^{-7}$ |
| | $A_8 = 3.3577 \times 10^{-8}$ | $A_{10} = 9.3400 \times 10^{-11}$ |
| the eleventh surface | | |
| $K = 0$ | $A_4 = 8.9600 \times 10^{-5}$ | $A_6 = 1.7434 \times 10^{-5}$ |
| | $A_8 = -2.0088 \times 10^{-8}$ | $A_{10} = 9.1843 \times 10^{-10}$ |
| the twelfth surface | | |
| $K = 0$ | $A_4 = 7.8974 \times 10^{-5}$ | $A_6 = 3.6755 \times 10^{-7}$ |
| | $A_8 = -2.2277 \times 10^{-9}$ | $A_{10} = 1.9965 \times 10^{-11}$ |

Zoom Data
The field angle in the second embodiment are shown below.

| (full angle of field = 2 ω°) | | | |
|---|---|---|---|
| | short focal length end | middle focal length position | long focal length end |
| | 75.0 | 40.6 | 21.0 |
| when D0 (distance to the first surface from an object) is ∞: | | | |
| f (mm) | 28.94 | 57.95 | 115.8 |
| Fno. | 6.0 | 9.2 | 13.4 |
| D1 | 1.82 | 5.41 | 12.77 |
| D2 | 2.65 | 3.44 | 4.22 |
| D3 | 12.76 | 7.36 | 3.68 |
| when D0 (distance to the first surface from an object) is 60 cm: | | | |
| f (mm) | 28.94 | 57.95 | 115.8 |
| Fno. | 6.0 | 9.2 | 13.4 |
| D1 | 1.82 | 5.41 | 12.77 |
| D2 | 1.96 | 2.61 | 3.00 |
| D3 | 13.45 | 8.19 | 4.90 |

The Third Embodiment

Figures 3A, 3B, 3C:
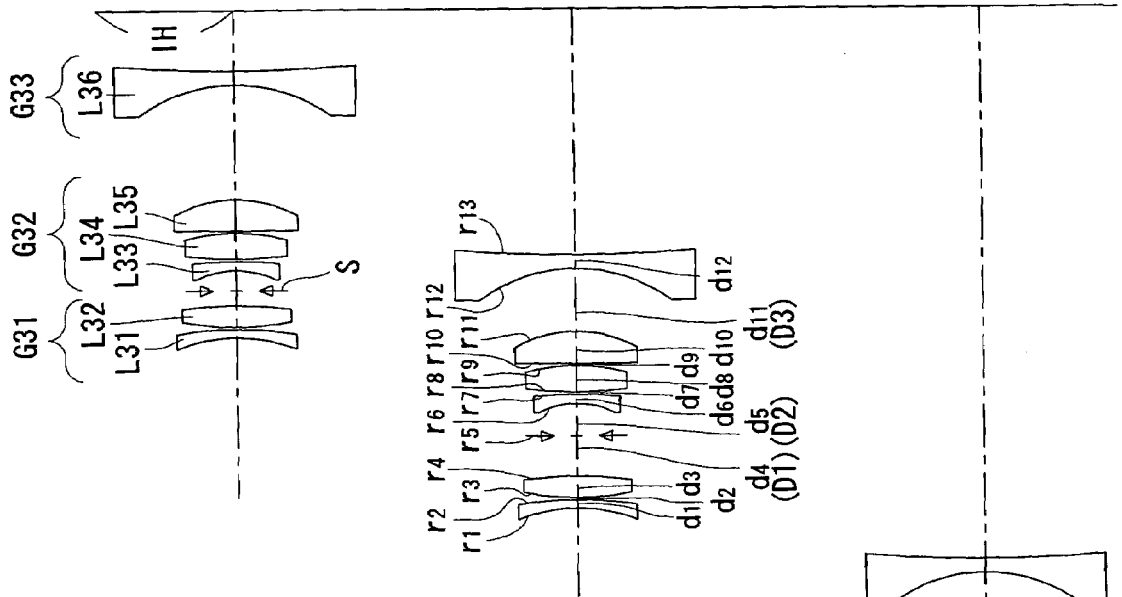
FIGS. 3A, 3B and 3C are sectional views showing an optical arrangement developed along the optical axis at a short focal length end, a middle position and a long focal length end respectively, in a third embodiment of a wide zoom lens optical system according to the present invention.
Figure 6A:
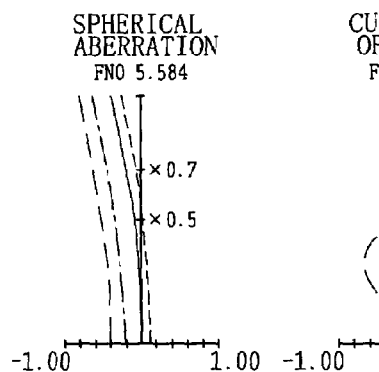
FIGS. 6A to 6D, 6E to 6H, and 6I to 6L are aberration diagrams showing spherical aberration, curvature of field, distortion and magnification achromatic aberration at a short focal length end, a middle position and a long focal length end respectively, in the third embodiment.
Figure 6B:
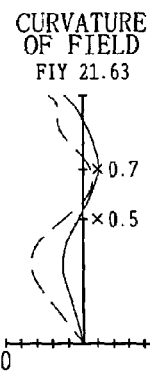
Figure 6C:
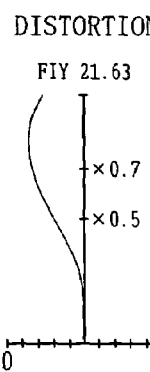
Figure 6D:
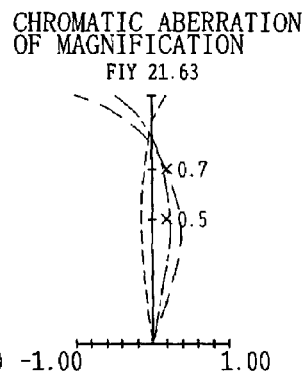
Figure 6E:
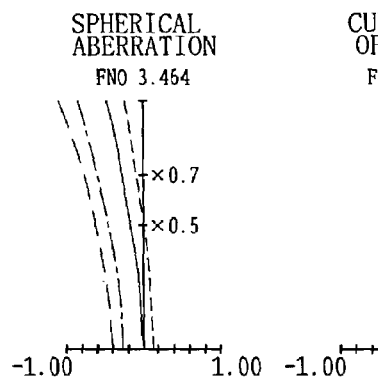
Figure 6F:
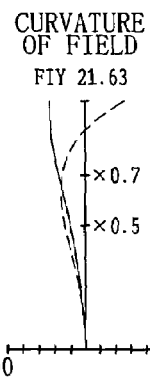
Figure 6G:
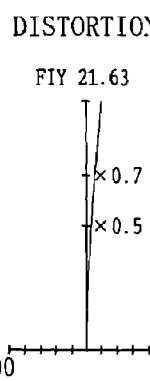
Figure 6H:
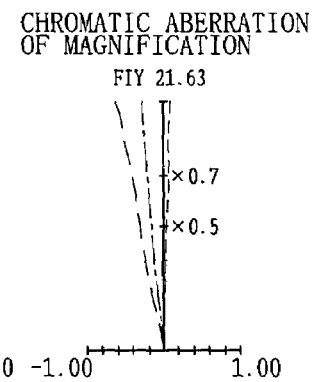
Figure 6I:
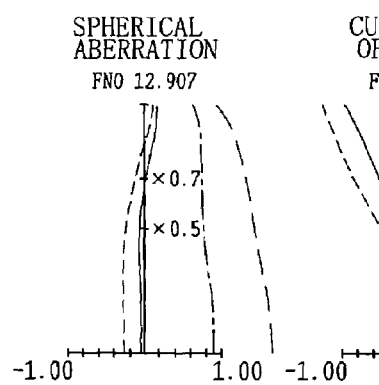
Figure 6J:
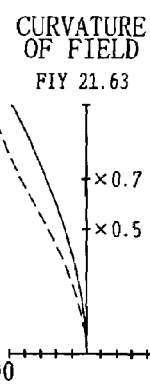
Figure 6K:
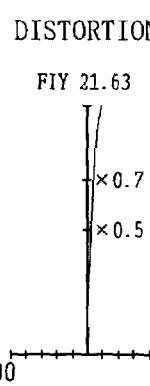
Figure 6L:
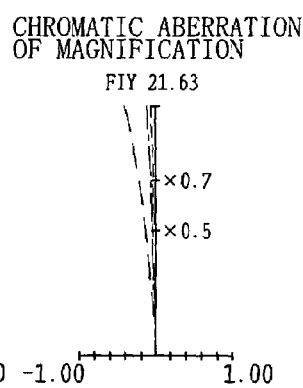

FIGS. 3A, 3B and 3C are sectional views showing an optical arrangement developed along the optical axis at a short focal length end, a middle position and a long focal length end respectively, of the zoom lens in the third embodiment according to the present invention. FIGS. 6A to 6D, 6E to 6H and 6I to 6L are aberration diagrams showing spherical aberration, curvature of field, distortion and achromatic aberration of magnification at the short focal length end, the middle position and the long focal length end respectively, in the third embodiment.

The wide angle zoom lens of the third embodiment has in order from an object side, a first lens group G31, an aperture stop S, a second lens group G32, and a third lens group G33, as shown in FIG. 3.

The first lens group G31 comprises in order from the object side, a meniscus lens L31 having negative refracting power and a concave surface directed toward the object side, and a lens L32 having positive refracting power and double convex surfaces. The second lens group G32 comprises in order from the object side, a meniscus lens L33 having negative refracting power and a concave surface directed toward the object side, and lenses L34 and L35, each of which has positive refracting power and double convex surfaces. The third lens group G33 comprises a lens L36 having negative refracting power and a concave surface directed toward the object side. The aperture stop S is arranged between the first lens group G31 and the second lens group G32. Aspherical surfaces are formed on both surfaces of the lens L35 in the second lens group G32 and the surface at the object side of the lens L36 in the third lens group G33, respectively.

In case that zooming is carried out from the short focal length end to the long focal length end when focusing is performed at the infinite-distance object point, the aperture stop S, the first lens group G31, the second lens group G32 and the third lens group G33 are moved together to the object side. At this time, the first lens group G31 moves so as to widen the distance to the second lens group G32. At the same time, the second lens group G32 and the third lens group G33 are moved toward the object side so as to reduce the distance between them. It is desirable that at the time of focusing of an object point at a short distance, focusing from the infinite distance to the very close distance is performed by moving the second lens group from the image side toward the object side, and the aperture stop S remains fixed.

| Numerical data 3 | | | |
|---|---|---|---|
| $r_1 = -21.256$ | $d_1 = 1.00$ | $n_{d1} = 1.68893$ | $v_{d1} = 31.07$ |
| $r_2 = -50.557$ | $d_2 = 0.20$ | | |
| $r_3 = 21.800$ | $d_3 = 2.46$ | $n_{d3} = 1.48749$ | $v_{d3} = 70.23$ |
| $r_4 = -33.759$ | $d_4 = D1$ | | |
| $r_5 = \infty$ (aperture stop) | $d_5 = D2$ | | |
| $r_6 = -9.679$ | $d_6 = 1.00$ | $n_{d6} = 1.72916$ | $v_{d6} = 54.68$ |
| $r_7 = -95.617$ | $d_7 = 0.20$ | | |
| $r_8 = 46.686$ | $d_8 = 3.00$ | $n_{d8} = 1.51742$ | $v_{d8} = 52.43$ |
| $r_9 = -17.418$ | $d_9 = 0.20$ | | |
| $r_{10} = 116.948$ (aspherical surface) | $d_{10} = 3.50$ | $n_{d10} = 1.58913$ | $v_{d10} = 61.28$ |
| $r_{11} = -10.916$ (aspherical surface) | $d_{11} = D3$ | | |
| $r_{12} = -13.337$ (aspherical surface) | $d_{12} = 1.50$ | $n_{d12} = 1.74320$ | $v_{d12} = 49.34$ |
| $r_{13} = 114.203$ | | | |
| P = image surface | | | |

| aspherical surface coefficient | | |
|---|---|---|
| The tenth surface | | |
| K = 0 | $A_4 = -7.8546 \times 10^{-5}$ | $A_6 = 9.9824 \times 10^{-7}$ |
| | $A_8 = 2.4247 \times 10^{-8}$ | $A_{10} = -1.4068 \times 10^{-10}$ |
| The eleventh surface | | |
| K = 0 | $A_4 = 7.5903 \times 10^{-5}$ | $A_6 = 5.8299 \times 10^{-7}$ |
| | $A_8 = -1.5682 \times 10^{-8}$ | $A_{10} = 3.0052 \times 10^{-10}$ |
| The twelfth surface | | |
| K = 0 | $A_4 = 7.0522 \times 10^{-5}$ | $A_6 = 5.4840 \times 10^{-7}$ |
| | $A_8 = -4.5184 \times 10^{-9}$ | $A_{10} = 2.3416 \times 10^{-11}$ |

Zoom Data

The field angle in the second embodiment are shown below.

| (full angle of field = $2\omega°$) | | | |
|---|---|---|---|
| | short focal length end | middle focal length position | long focal length end |
| | 83.7 | 46.4 | 24.2 |
| when D0 (distance to the first surface from an object) is $\infty$: | | | |
| f (mm) | 24.83 | 49.88 | 100.01 |
| Fno | 5.58 | 8.46 | 12.91 |
| D1 | 1.53 | 4.51 | 10.62 |
| D2 | 2.25 | 3.44 | 4.22 |
| D3 | 12.51 | 6.96 | 3.50 |
| when D0 (distance to the first surface from an object) is 60 cm: | | | |
| f (mm) | 24.83 | 49.88 | 100.01 |
| Fno | 5.58 | 8.46 | 12.91 |
| D1 | 1.53 | 4.51 | 10.62 |
| D2 | 1.69 | 2.76 | 3.28 |
| D3 | 13.07 | 7.63 | 4.44 |

Numerical values of items and values calculated by conditions mentioned above concerning each embodiment are shown in the following table 1.

TABLE 1

| | The first embodiment | The second embodiment | The third embodiment |
|---|---|---|---|
| fw | 28.94 | 28.94 | 24.83 |
| ft | 115.81 | 115.80 | 100.01 |
| IH | 21.63 | 21.63 | 21.63 |
| fl_G1 | 53.51 | 52.68 | 52.58 |
| sk_w | 8.29 | 8.44 | 6.69 |
| fl_L2ob | −17.09 | −15.81 | −14.84 |
| fl_L2im | 20.43 | 19.54 | 17.12 |
| S23 | 12.54 | 12.76 | 12.51 |
| Ss2w | 2.55 | 2.65 | 2.25 |
| Ss2t | 4.77 | 4.22 | 4.22 |
| S23/fw | 4.33 | 4.41 | 5.04 |
| (Ss2t−Ss2w)/fw | 0.077 | 0.054 | 0.079 |
| Ss2w/fw | 0.088 | 0.092 | 0.091 |
| condition(1) | 4.00 | 4.00 | 4.03 |
| condition(2) | 0.747 | 0.748 | 0.871 |
| condition(3) | 2.164 | 2.198 | 1.902 |
| condition(4) | 3.491 | 3.428 | 3.711 |
| condition(5) | 0.836 | 0.809 | 0.867 |
| condition(6) | 1.6935 | 1.7432 | 1.7432 |

Figure 7:
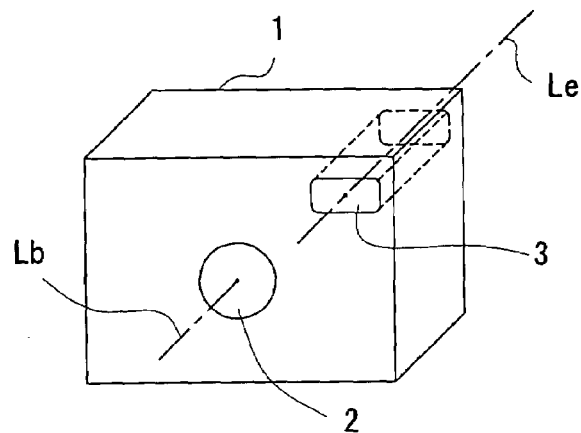
FIG. 7 is an outline perspective view showing an example of a camera using a wide angle zoom optical system of the present invention.
Figure 8:
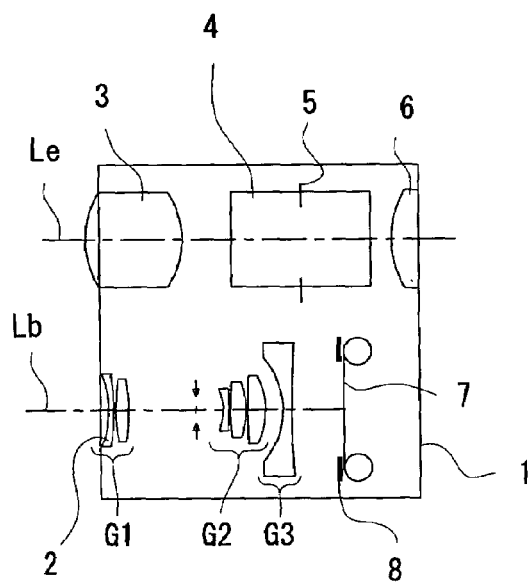
FIG. 8 is a sectional view schematically showing an inside of the camera in FIG. 7.

The wide angle zoom optical system of the present invention explained above is used as a taking lens for compact cameras as shown in the perspective view FIG. 7 and in the sectional view FIG. 8, respectively.

In FIG. 8, G1 represents a first lens group, G2 is a second lens group, and G3 is a third lens group.

Moreover, the reference symbol Lb is a photographing optical path, Le is an optical path for a finder, and the photographing optical path Lb and the optical path Le for a finder are located in parallel. The image of a photographing subject is observed by a finder comprising a taking lens 3 for a finder, an image erected prism 4, an aperture stop 5 and an eyepiece 6, and it is formed on a film 7 by the lens groups G1, G2, and G3 which contain a taking lens 2 for photographing.

Figure 9:
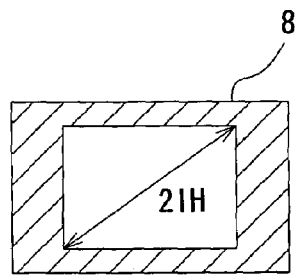
FIG. 9 is an explanatory diagram showing a diagonal length of a frame 8 (field stop) of the camera in FIG. 7.

Here, a frame (field stop) with an opening of rectangle 5 which specifies an extent of imaging field as shown in FIG. 9 is located just before the film. The diagonal length of this frame is shown by 2IH(s).

Moreover, the wide angle zoom lens system of the present invention can be used as a photograph taking lens of a compact electronic camera using an electronic imaging element, such as CCD or the like, instead of film.

In that case, a lens having positive refracting power can be arranged just before the image surface of the electronic imaging element so that the chief ray on the axis which enters to the electronic imaging element and the chief ray off the axis may become almost perpendicular. In this case, the diagonal length of the maximum effective imaging field of the electronic imaging element is 21H.

What is claimed is:

1. An imaging apparatus comprising:
    a zoom lens; and
    a field stop for determining an extent of an imaging field, arranged on an image side of the zoom lens,
    the zoom lens comprising, in order from an object side,
        a first lens group having positive refracting power,
        a second lens group having at least three lens elements and having positive refracting power, and
        a third lens group consisting of one single lens element and having negative refracting power,
    wherein zooming from a short focal length end to a long focal length end is performed by moving each of the lens groups to the object side, and
    wherein the following conditions are satisfied:

$3.0 < ft/fw$ $0.7 < IH/fw < 0.9$ $1.75 < ft/fl\_G1 < 2.5$ $2.8 < fw/sk\_w < 4.1$ where ft is a focal length of the zoom lens at the long focal length end, fw is a focal length of the zoom lens at the short focal length end, IH is a maximum image height, fl_G1 is a composite focal length of the first lens group, and sk_w is a backfocus at the short focal length end.

2. The imaging apparatus according to claim 1, wherein the single lens element composing the third lens group satisfies the following condition:

$nd\_G3 > 1.61$ where nd_G3 is a refractive index of the single lens element of the third lens group.

3. The imaging apparatus according to claim 1, wherein the first lens group comprises: in order from the object side, a meniscus lens element having negative refracting power and a concave surface directed toward the object side; and a lens element having positive refracting power.

4. The imaging apparatus according to claim 3, wherein a total number of lenses in the first lens group is two.

5. The imaging apparatus according to claim 1, wherein a distance between the first lens group and the second lens group is longer at the long focal length end than at the short focal length end and a distance between the second lens group and the third lens group is shorter at the long focal length end than at the short focal length end.

6. The imaging apparatus according to claim 1, wherein a total number of lenses in the second lens group is three.

7. The imaging apparatus according to claim 1, wherein the first lens group is arranged at an utmost object-side position in the zoom lens, and wherein, of distances between mutually adjacent lenses in the zoom lens, only a distance between the first lens group and the second lens group and a distance between the second lens group and the third lens group are variable in the zooming.

8. The imaging apparatus according to claim 1, wherein a total number of lenses in the zoom lens is six.

9. An imaging apparatus comprising:
    a zoom lens; and
    a field stop for determining an extent of an imaging field, arranged on an image side of the zoom lens,
    the zoom lens comprising, in order from an object side,
        a first lens group having positive refracting power,
        a second lens group having positive refracting power and having at least two lens elements, and
        a third lens group having negative refracting power and consisting of one single lens element,
    wherein zooming from a short focal length end to a long focal length end is performed by moving each of the lens groups to the object side, and
    wherein the following conditions are satisfied:

$3.0 < ft/fw$ $0.7 < IH/fw < 0.9$ $0.6 < |fl\_L2ob/fl\_L2im| < 1.0$ where ft is a focal length of the zoom lens at the long focal length end, fw is a focal length of the zoom lens at the short focal length end, IH is a maximum image height, $fl_{13}L2ob$ is a focal length of a lens that is arranged at an utmost object-side position in the second lens group, and fl_L2im is a focal length of a lens that is arranged at an utmost image-side position in the second lens group.

10. The imaging apparatus according to claim 9, wherein the single lens element composing the third lens group satisfies the following condition:

$nd\_G3 > 1.61$ where nd_G3 is a refractive index of the single lens element of the third lens group.

11. The imaging apparatus according to claim 9, wherein the first lens group comprises: in order from the object side, a meniscus lens element having negative refracting power and a concave surface directed toward the object side; and a lens element having positive refracting power.

12. The imaging apparatus according to claim 9, wherein a distance between the first lens group and the second lens group is longer at the long focal length end than at the short focal length end and a distance between the second lens group and the third lens group is shorter at the long focal length end than at the short focal length end.

13. The imaging apparatus according to claim 9, wherein a total number of lenses in the second lens group is three.

14. The imaging apparatus according to claim 9, wherein the first lens group is arranged at an utmost object-side position in the zoom lens, and wherein, of distances between mutually adjacent lenses in the zoom lens, only a distance between the first lens group and the second lens group and a distance between the second lens group and the third lens group are variable in the zooming.

15. The imaging apparatus according to claim 9, wherein a total number of lenses in the zoom lens is six.

16. An imaging apparatus comprising:
a zoom lens; and
a field stop for determining an extent of an imaging field arranged on an image side of the zoom lens,
the zoom lens comprising, in order from an object side,
a first lens group having positive refracting power,
a second lens group having positive refracting power and having at least three lens elements, and
a third lens group having negative refracting power and consisting of one single lens element,
wherein an aperture stop is arranged between the first lens group and the second lens group,
wherein zooming from a short focal length end to a long focal length end is performed by moving each of the lens groups to the object side, and
wherein the following conditions are satisfied:

$3.0 < ft/fw$ $0.7 < IH/fw < 0.9$ where ft is a focal length of the zoom lens at the long focal length end, fw is a focal length of the zoom lens at the short focal length end, and IH is a maximum image height.

17. The imaging apparatus according to claim 16, wherein focusing is performed by moving the second lens group, and the aperture stop remains fixed in a direction of an optical axis when the focusing is performed.

18. The imaging apparatus according to claim 16, wherein the single lens element composing the third lens group satisfies the following condition:

$nd\_G3 > 1.61$ where nd_G3 is a refractive index of the single lens element of the third lens group.

19. The imaging apparatus according to claim 16, wherein the first lens group comprises: in order from the object side, a meniscus lens element having negative refracting power and a concave surface directed toward the object side; and a lens element having positive refracting power.

20. The imaging apparatus according to claim 16, wherein a distance between the first lens group and the second lens group is longer at the long focal length end than at the short focal length end and a distance between the second lens group and the third lens group is shorter at the long focal length end than at the short focal length end.

21. The imaging apparatus according to claim 16, wherein a total number of lenses in the second lens group is three.

22. The imaging apparatus according to claim 16, wherein the first lens group is arranged at an utmost object-side position in the zoom lens, and wherein, of distances between mutually adjacent lenses in the zoom lens, only a distance between the first lens group and the second lens group and a distance between the second lens group and the third lens group are variable in the zooming.

23. The imaging apparatus according to claim 16, wherein a total number of lenses in the zoom lens is six.

24. An imaging apparatus comprising;
a zoom lens; and
a field stop for determining an extent of an imaging field, arranged on an image side of the zoom lens,
the zoom lens comprising in order from an object side, a first lens group having positive refracting power,
a second lens group having positive refracting power, and
a third lens group having negative refracting power and consisting of one single lens element,
wherein zooming from a short focal length end to a long focal length end is performed by moving each of the lens groups to the object side,
wherein an aperture stop is arranged between the first lens group and the second lens group and moves in such a manner that a distance therefrom to the second lens group is longer at the long focal length end than at the short focal length end, and
wherein the following conditions are satisfied:

$3.0 < ft/fw$ $0.7 < IH/fw < 0.9$ where ft is a focal length of the zoom lens at the long focal length end, fw is a focal length of the zoom lens at the short focal length end, and IH is a maximum image height.

25. The imaging apparatus according to claim 24, wherein focusing is performed by moving the second lens group, and the aperture stop remains fixed in a direction of an optical axis when the focusing is performed.

26. The imaging apparatus according to claim 24, wherein the single lens element composing the third lens group satisfies the following condition:

$Nd\_G3 > 1.61$ where nd_G3 is a refractive index of the single lens element of the third lens group.

27. The imaging apparatus according to claim 24, wherein the first lens group comprises, in order from the object side: a meniscus lens element having negative refracting power and a concave surface directed toward the object side; and a lens element having positive refracting power.

28. The imaging apparatus according to claim 24, wherein a distance between the first lens group and the second lens group is longer at the long focal length end than at the short focal length end and a distance between the second lens group and the third lens group is shorter at the long focal length end than at the short focal length end.

29. The imaging apparatus according to claim 24, wherein a total number of lenses in the second lens group is three.

30. The imaging apparatus according to claim 24, wherein the first lens group is arranged at an utmost object-side position in the zoom lens, and wherein, of distances between mutually adjacent lenses in the zoom lens, only a distance between the first lens group and the second lens group and a distance between the second lens group and the third lens group are variable in the zooming.

31. The imaging apparatus according to claim 24, wherein a total number of lenses in the zoom lens is six.

32. A zoom lens comprising, in order from an object side:
a first lens group having positive refracting power;
a second lens group having positive refracting power and having at least three lens elements; and
a third lens group having negative refracting power and consisting of one single lens element,
wherein zooming from a short focal length end to a long focal length end is performed by moving each of the lens groups to the object side,
wherein the first lens group is arranged at an utmost object-side position in the zoom lens,
wherein, of distances between mutually adjacent lenses in the zoom lens, only a distance between the first lens group and the second lens group and a distance between the second lens group and the third lens group are variable in the zooming, and wherein the following conditions are satisfied:

$$1.75 < ft/fl\_G1 < 2.5$$

$$0.6 < |fl\_L2ob/fl\_L2im| < 1.0$$

where ft is a focal length of the zoom lens at the long focal length end, fw is a focal length of the zoom lens at the short focal length end fl_G1 is a composite focal length of the first lens group, fl_L2ob is a focal length of a lens that is arranged at an utmost object-side position in the second lens group, and fl_L2im is a focal length of a lens that is arranged at an utmost image-side position in the second lens group.

33. The zoom lens according to claim 32, wherein an aperture stop is arranged between the first lens group and the second lens group.

34. The zoom lens according to claim 33, wherein the aperture stop moves in such a manner that a distance therefrom to the second lens group is longer at the long focal length end than at the short focal length end.

35. The zoom lens according to claim 33, wherein focusing is performed by moving the second lens group, and the aperture stop remains fixed in a direction of an optical axis when the focusing is performed.

36. The zoom lens according to claim 32, wherein the third lens group consists of only one single lens element, which satisfies the following condition:

$$nd\_G3 > 1.61$$

where nd_G3 is a refractive index of the single lens element of the third lens group.

37. The zoom lens according to claim 32, wherein the first lens group comprises: in order from an object side, a meniscus lens element having negative refracting power and a concave surface directed toward the object side; and a lens element having positive refracting power.

38. The zoom lens according to claim 37, wherein a total number of lenses in the first lens group is two.

39. The zoom lens according to claim 37, wherein a total number of lenses in the second lens group is three.

40. The zoom lens according to claim 32, wherein the distance between the first lens group and the second lens group is longer at the long focal length end than at the short focal length end and the distance between the second lens group and the third lens group is shorter at the long focal length end than at the short focal length end.

41. An imaging apparatus comprising the zoom lens according to claim 32, and a field stop for determining an extent of an imaging field arranged at an image side of the zoom lens.

42. A zoom lens comprising, in order from an object side:
a first lens group having positive refracting power;
a second lens group having positive refracting power and having at least three lens elements; and
a third lens group having negative refracting power and consisting of one single lens element,
wherein zooming from a short focal length end to a long focal length end is performed by moving each of the lens groups to the object side, wherein the following conditions are satisfied:

$$1.75 < ft/fl\_G1 < 2.5$$

$$0.6 < |fl\_L2ob/fl\_L2im| < 1.0$$

where ft is a focal length of the zoom lens at the long focal length end, fw is a focal length of the zoom lens at the short focal length end fl_G1 is a composite focal length of the first lens group, fl_L2ob is a focal length of a lens that is arranged at an utmost object-side position in the second lens group, and fl_L2im is a focal length of a lens that is arranged at an utmost image-side position of the second lens group, and
wherein the first lens group comprises: in order from an object side, a meniscus lens element having negative refracting power and a concave surface directed toward the object side; and a lens element having positive refracting power.

43. The zoom lens according to claim 42, wherein a total number of lenses in the first lens group is two.

44. The zoom lens according to claim 42, wherein a total number of lenses in the second group is three.

45. A zoom lens comprising, in order from an object side:
a first lens group having positive refracting power;
a second lens group having positive refracting power and having at least three lens elements; and
a third lens group having negative refracting power and consisting of one single lens element,
wherein zooming from a short focal length end to a long focal length end is performed by moving each of the lens groups to the object side, wherein a total number of lenses in the zoom lens is six, and wherein the following conditions are satisfied:

$$1.75 < ft/fl\_G1 < 2.5$$

$$0.6 < |fl\_L2ob/fl\_L2im| < 1.0$$

where ft is a focal length of the zoom lens at the long focal length end, fw is a focal length of the zoom lens at the short focal length end fl_G1 is a composite focal length of the first lens group, fl_L2ob is a focal length of a lens that is arranged at an utmost object-side position in the second lens group, and fl_L2im is a focal length of a lens that is arranged at an utmost image-side position in the second lens group.

* * * * *

UNITED STATES PATENT AND TRADEMARK OFFICE
CERTIFICATE OF CORRECTION

PATENT NO. : 7,173,770 B2  
APPLICATION NO. : 10/929548  
DATED : February 6, 2007  
INVENTOR(S) : Yasutaka Kashiki It is certified that error appears in the above-identified patent and that said Letters Patent is hereby corrected as shown below:

Column 19, line 51, change "$nd_{G}3>1.61$" to -- $nd\_G3>1.61$ --; and

Column 20, line 33, change "$fl_{13}L2ob$" to -- $fl\_L2ob$ --.

Signed and Sealed this

Twenty-ninth Day of April, 2008

JON W. DUDAS  
*Director of the United States Patent and Trademark Office*